(12) United States Patent
Maibach et al.

(10) Patent No.: US 10,452,383 B1
(45) Date of Patent: Oct. 22, 2019

(54) DEVICE IMPROVEMENTS THROUGH ADAPTIVE SETTINGS

(71) Applicant: Square, Inc., San Francisco, CA (US)

(72) Inventors: Matthew H. Maibach, San Francisco, CA (US); Sean Hafemann, Lafayette, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/582,241

(22) Filed: Apr. 28, 2017

(51) Int. Cl.
*G06F 11/07* (2006.01)
*G06F 17/30* (2006.01)
*G06F 11/00* (2006.01)
*G06F 9/30* (2018.01)
*G06F 8/65* (2018.01)
*G06Q 20/32* (2012.01)
*G06F 11/22* (2006.01)
*G06F 11/14* (2006.01)
*G06F 21/56* (2013.01)

(52) U.S. Cl.
CPC ............. *G06F 8/65* (2013.01); *G06Q 20/327* (2013.01); *G06F 11/0772* (2013.01); *G06F 11/1484* (2013.01); *G06F 11/2284* (2013.01); *G06F 21/568* (2013.01)

(58) Field of Classification Search
CPC ............. G06F 11/2284; G06F 11/0772; G06F 11/0709; G06F 11/1484; G06F 21/568; G06F 11/3006; G06F 11/076; G06F 9/30098
See application file for complete search history.

(56) References Cited

U.S. PATENT DOCUMENTS

| | | | | |
|---|---|---|---|---|
| 6,741,555 | B1* | 5/2004 | Li | H04L 47/10 370/229 |
| 6,920,179 | B1* | 7/2005 | Anand | H04N 21/234327 375/240.25 |
| 7,249,286 | B1* | 7/2007 | Krishnan | H04L 41/0663 714/27 |
| 7,540,030 | B1* | 5/2009 | Zaitsev | G06F 21/568 713/187 |
| 7,809,811 | B1* | 10/2010 | Rao | G06F 15/173 709/221 |
| 7,813,822 | B1* | 10/2010 | Hoffberg | G06K 9/00369 381/73.1 |
| 7,920,495 | B2* | 4/2011 | Salokannel | H04W 72/10 370/310 |

(Continued)

OTHER PUBLICATIONS

Soila Pertet et al., Causes of Failure in Web Applications, Dec. 2005, [Retrieved on Jun. 18, 2019]. Retrieved from the internet: <https://www.cs.cmu.edu/~priya/PDL-CMU-05-109.pdf> 19 Pages (1-19) (Year: 2005).*

(Continued)

*Primary Examiner* — Anibal Rivera
(74) *Attorney, Agent, or Firm* — Polsinelli PC—Square (57) ABSTRACT

The disclosed technology can provide software implemented solutions to problems experienced by a specific device when deployed in an operating environment by detecting problems experienced by the specific device that might not be experienced by other similar devices. Once detected, a firmware update for the specific device can be issued to solve or avoid the detected problem.

20 Claims, 7 Drawing Sheets

(56) References Cited

U.S. PATENT DOCUMENTS

| | | | | |
|---|---|---|---|---|
| 8,794,517 B1* | 8/2014 | Templeton | G06Q 20/3567 | 235/375 |
| 8,910,868 B1* | 12/2014 | Wade | G06K 7/0095 | 235/449 |
| 9,069,737 B1* | 6/2015 | Kimotho | G06F 11/1484 | |
| 9,112,799 B2* | 8/2015 | Zhou | H04L 47/11 | |
| 9,439,205 B1* | 9/2016 | Lin | H04L 67/12 | |
| 9,548,797 B1* | 1/2017 | Green | H04B 5/0031 | |
| 9,661,672 B2* | 5/2017 | Aoki | H04W 76/023 | |
| 9,667,756 B2* | 5/2017 | Koo | H04L 69/22 | |
| 9,852,016 B2* | 12/2017 | Griffith | H04L 43/10 | |
| 2004/0098715 A1* | 5/2004 | Aghera | G06F 8/65 | 717/173 |
| 2005/0141747 A1* | 6/2005 | Shi | G06T 1/0028 | 382/100 |
| 2006/0217113 A1* | 9/2006 | Rao | H04L 41/0233 | 455/422.1 |
| 2009/0177890 A1* | 7/2009 | Mueller | B60W 50/00 | 713/176 |
| 2011/0044314 A1* | 2/2011 | Calvanese Strinati | H04L 1/1867 | 370/344 |
| 2011/0134909 A1* | 6/2011 | Huang | H04L 1/0009 | 370/352 |
| 2011/0271163 A1* | 11/2011 | Le Floch | H03M 13/353 | 714/752 |
| 2012/0066547 A1* | 3/2012 | Gilbert | H04L 41/065 | 714/26 |
| 2012/0272206 A1* | 10/2012 | Sengupta | G06F 17/2705 | 717/101 |
| 2013/0036062 A1* | 2/2013 | Natarajan | G06Q 10/00 | 705/304 |
| 2013/0124607 A1* | 5/2013 | Griffith | H04L 43/10 | 709/203 |
| 2013/0124718 A1* | 5/2013 | Griffith | G06F 11/3006 | 709/224 |
| 2013/0124752 A1* | 5/2013 | Griffith | G06F 11/3006 | 709/235 |
| 2013/0124911 A1* | 5/2013 | Griffith | H04L 45/28 | 714/4.2 |
| 2013/0166886 A1* | 6/2013 | Sasanka | G06F 9/30098 | 712/216 |
| 2013/0322246 A1* | 12/2013 | Zhou | H04L 47/11 | 370/235 |
| 2013/0322468 A1* | 12/2013 | Koo | H04L 69/22 | 370/474 |
| 2014/0208150 A1* | 7/2014 | Abuelsaad | G06F 11/0709 | 714/2 |
| 2015/0161616 A1* | 6/2015 | Brunet | G06Q 30/016 | 713/1 |
| 2015/0245400 A1* | 8/2015 | Aoki | H04W 76/12 | 370/329 |
| 2016/0041864 A1* | 2/2016 | Yu | G06F 11/0772 | 714/57 |
| 2016/0078382 A1* | 3/2016 | Watkins | G06Q 10/06315 | 705/7.25 |
| 2016/0139974 A1* | 5/2016 | Herb | G06F 11/079 | 714/37 |
| 2016/0239487 A1* | 8/2016 | Potharaju | G06F 16/24578 | |
| 2016/0328282 A1* | 11/2016 | Rogati | G06F 11/0772 | |
| 2016/0371163 A1* | 12/2016 | Swierk | G06F 11/2284 | |
| 2017/0006141 A1* | 1/2017 | Bhadra | H04W 4/70 | |
| 2017/0033889 A1* | 2/2017 | Ma | H04L 1/206 | |
| 2017/0060546 A1* | 3/2017 | Prasad | G06F 8/41 | |
| 2017/0093730 A1* | 3/2017 | Roberts | H04L 45/38 | |
| 2017/0117987 A1* | 4/2017 | Park | H04L 1/0008 | |
| 2017/0118573 A1* | 4/2017 | Yae | H04W 4/046 | |
| 2017/0132055 A1* | 5/2017 | Wu | G06F 11/076 | |
| 2017/0207989 A1* | 7/2017 | Cai | H04L 61/1511 | |
| 2017/0237471 A1* | 8/2017 | Green | H04B 5/0043 | 315/129 |
| 2017/0238397 A1* | 8/2017 | Green | H04B 5/0062 | 315/129 |
| 2017/0296056 A1* | 10/2017 | Hresko | A61B 5/0015 | |
| 2018/0196402 A1* | 7/2018 | Glaser | G05B 19/042 | |

OTHER PUBLICATIONS

Jorg Ott et al., Applying DTN to Mobile Internet Access: An Experiment with HTTP, Jul. 12, 2005, [Retrieved on Jun. 18, 2019]. Retrieved from the internet: <https://pdfs.semanticscholar.org/005c/84a7d6d9519726cebb375c0dc77b16c7b4f1.pdf> 13 Pages (1-13) (Year: 2005).*

* cited by examiner

DEVICE IMPROVEMENTS THROUGH ADAPTIVE SETTINGS

TECHNICAL FIELD

The present technology pertains to remedying problems observed in a device; and more specifically pertains to issuing a software update tailored to a specific device to solve or avoid an observed problem.

BACKGROUND

Even the best engineered and built devices can fail to operate as expected due to environmental conditions. For example, a device may be deployed in an environment that is subject to inconsistent power supplies, e.g., brownouts or blackouts. In another example, a device may be employed in environment that is subject to a lot of environmental interference with wireless communications. These environmental operating conditions are unique to each environment, and thus affect deployed devices differently. As such, it is difficult for a device manufacturer to ameliorate such issues since they may only affect a specific device.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for software implemented solutions to problems experienced by a specific device when deployed in an operating environment by detecting problems experienced by the specific device that might not be experienced by other similar devices. Once detected, a firmware update for the specific device can be issued to solve or avoid the detected problem.

While the specific device might be in good operating condition, environmental factors present in an operating environment for the specific device can cause problems with the function of the specific device. Such problems are not likely to be observed by similar devices (e.g., other devices in the same model line of the product) since the problems are specific to the operating environment for the specific device.

The present technology provides a solution to this problem by issues updates specific to the specific device to solve or avoid the detected problem.

Throughout this disclosure reference is made to a payment object reader and/or a point-of-sale terminal as example devices to which the present technology applies. However, it should be appreciated that the present technology can apply to any category of devices that can benefit from detecting a performance problem with a specific device and implementing a solution to the performance problem for the specific device.

Figure 1:
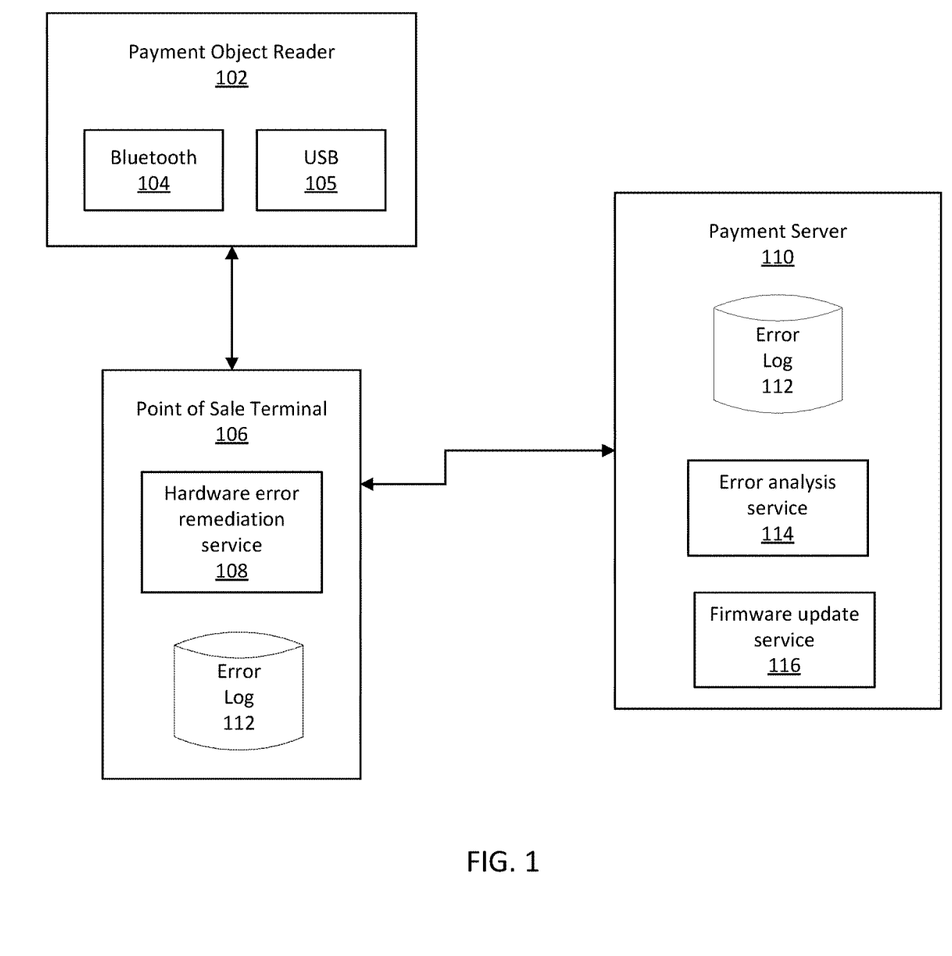
FIG. 1 shows an example system including a payment object reader in communication with a point of sale terminal, which is in communication with a payment service in accordance with some embodiments.

FIG. 1 illustrates an example system diagram showing payment object reader 102 in communication with point-of-sale terminal 106 which is in further communication with payment server 110. Point-of-sale terminal 106 is a computing device having a point-of-sale application useful in assisting a merchant and customer to complete a point-of-sale transaction. For example the point-of-sale application can include interfaces for receiving services or goods at a customer desires to purchase. The point-of-sale application can also include functions effective to calculate and apply local taxes and other functions helpful in facilitating point-of-sale transactions.

Point-of-sale system 106 can utilize payment object reader 102 to read payment objects. Payment objects can be, for example, a magnetic stripe card, a near field communication device, and integrated circuit card, etc. In some embodiments, as illustrated in FIG. 1, payment object reader 102 can be a standalone device that can communicate with point-of-sale terminal 106 wirelessly for example using Bluetooth interface 104, or using a wired connection for example universal serial bus (USB) 106. In some embodiments payment object reader 102 could be integrated into point-of-sale terminal 106.

In the embodiment illustrated in FIG. 1 payment object reader 102 is a device specifically for reading payment objects. Therefore, payment object reader 102 may not have hardware and software resources that are capable of performing much more than the specific purpose of payment object reader 102. In such embodiments payment object reader 102, may rely on point-of-sale terminal 106 to perform additional functions. For example payment object reader 102 may not be configured to communicate over the Internet directly to payment server 110, so payment object reader 102 may rely on point-of-sale terminal 106 to communicate with payment server 110 on behalf of payment object reader 102. Payment object reader 102 may also rely on point-of-sale terminal 106 to issue commands to payment object reader 102 to put payment object reader 102 into certain operational modes (e.g., a wake state, diagnostic state, etc.), or non-operational modes (e.g., a sleep state, standby, etc.).

When the system of FIG. 1 is working according to its intended operation, point-of-sale terminal 106 is operated by a merchant to enter transaction information such as goods or services that a consumer wishes to purchase. Payment object reader 102 receives and reads a payment object, and communicates encrypted payment object information to point-of-sale terminal 106 using Bluetooth interface 104 or USB 105. Point-of-sale terminal 106 then combines the encrypted payment object information along with the transaction information and sends the encrypted payment object information and transaction information to payment server 110. Payment server 110 decrypts payment object information and processes the transaction. After completion of the transaction payment server 110 can notify point-of-sale terminal 106 of the successful completion of the transaction. A receipt can be issued by the payment server 110 or can be issued by point-of-sale terminal 106.

However, due to environmental factors the system illustrated in FIG. 1 may not work as intended. For example, while payment object reader 102 may operate perfectly in a controlled environment, Bluetooth interface 104 might repeatedly disconnect from point-of-sale terminal 106 due to environmental interference (such as might be introduced by other wireless networks or electronic devices such as microwave). Likewise data being transmitted over USB 105 may have a high degree of errors due to noise introduced into the connection by environmental factors (such as might be introduced by an industrial appliance connected to the same power strip).

In the past, when such errors were encountered, they have been solved via troubleshooting by a human operator. However the present technology includes an example system and methods wherein point-of-sale terminal 106 may utilize hardware remediation service 108 to remedy the problems experienced by payment object reader 102.

Figure 2:
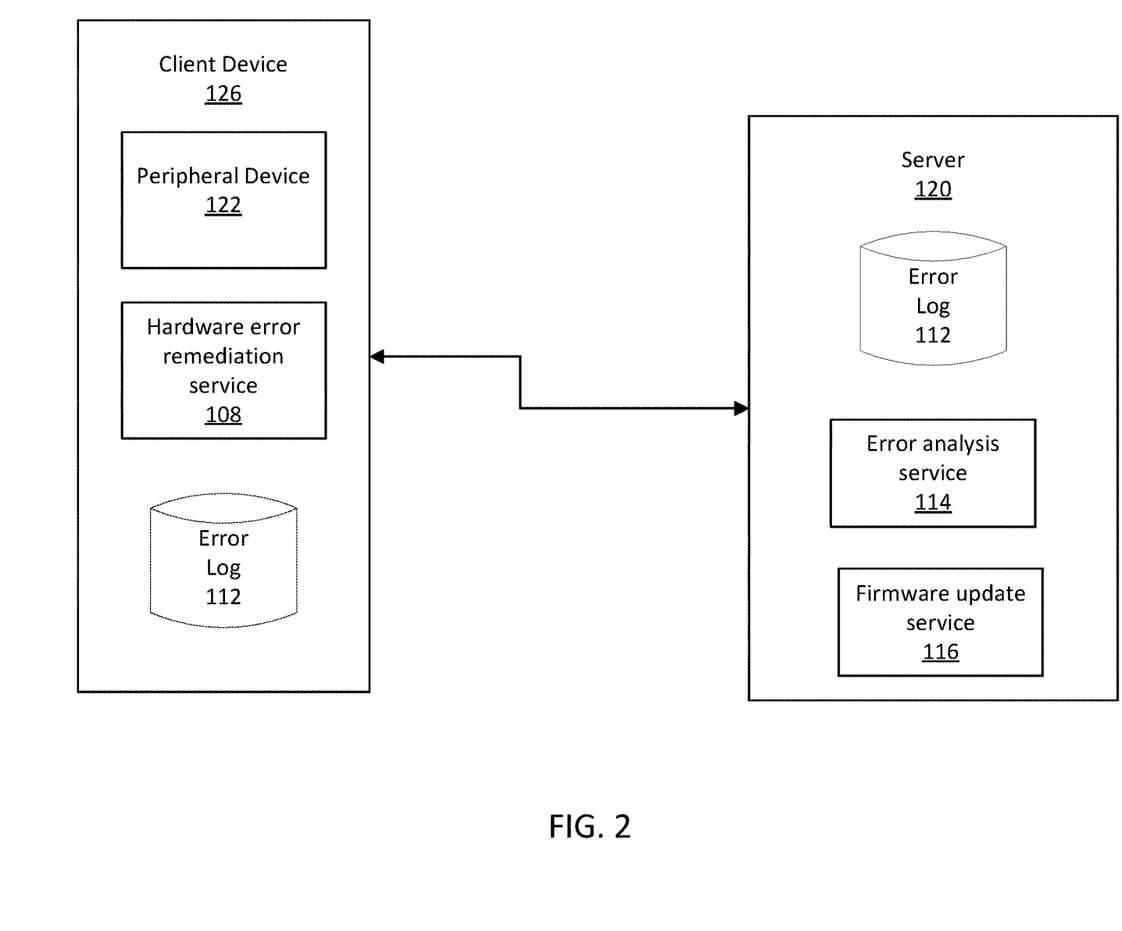
FIG. 2 shows an example system including a client device having a peripheral device integrated or in communication therewith, and the client device is in communication with a server in accordance with some embodiments.

FIG. 2 illustrates another example system diagram. FIG. 2 illustrates a system that is similar to the system illustrated in FIG. 1 except that the system in FIG. 2 is not limited to payment system. FIG. 2 illustrates client device 126 which can be considered a generic device performing the same role in remediating hardware errors as point-of-sale terminal 106 in FIG. 1. In FIG. 2, peripheral device 122 can be considered generic device performing the same role in remediating hardware errors as payment object reader 102 in FIG. 1. In FIG. 2 peripheral device 122 is shown within client device 126. This is illustrated as an optional arrangement and peripheral device can be a separate device or integrated with client device 126. Just as payment object reader 102 in FIG. 1, while shown separate from point-of-sale terminal 106, can be integrated with point-of-sale terminal 106, or be a separate device.

While throughout this description reference will be made to the devices illustrated in FIG. 1, it should be appreciated that the methods and computer readable instructions described herein as applying to a device in FIG. 1 will equally apply to its more generic counterpart illustrated in FIG. 2.

As addressed above the present technology is directed to remediating, avoiding, or solving problems encountered by point-of-sale terminal 106, or payment object reader 102 when deployed in an operating environment.

Figure 3:
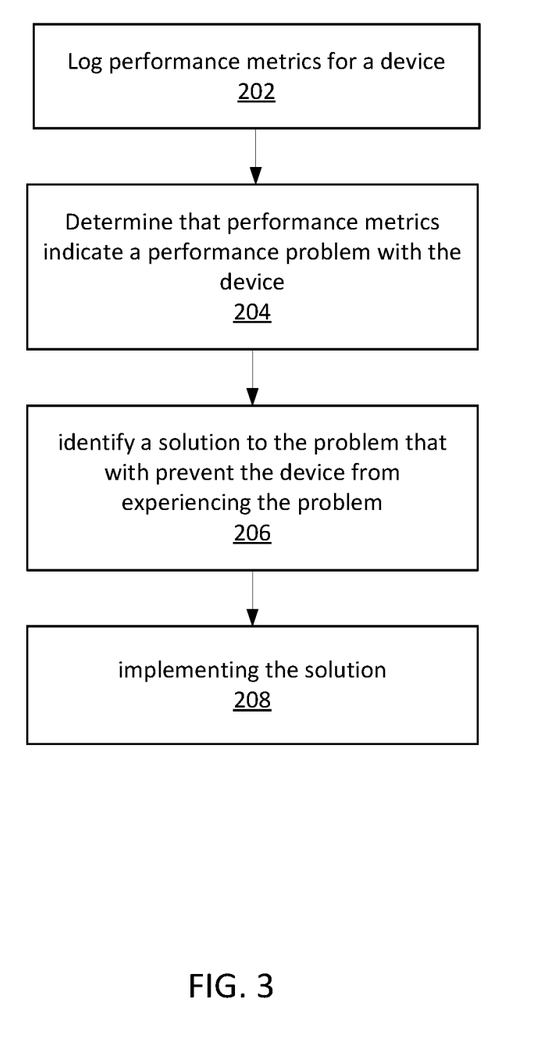
FIG. 3 illustrates an example method of the present technology.

FIG. 3 illustrates an example method for carrying out the present technology. First performance metrics for a device are logged 202. The device for which performance metrics are logged can be payment object reader 102 or, point-of-sale terminal 106. As illustrated in FIG. 1 errors can be logged in error log 112 at payment server 110 or error log at point-of-sale terminal 106.

When the error log 112 is located on payment server 110 error analysis service 114 can determine (204) that the performance metrics indicate a performance problem with the device by analyzing error log 112, and can identify (206) a solution to the problem that will prevent the device from experiencing the problem further. Payment server 110 can then implement (208) the solution by communicating with point-of-sale terminal 106. In some embodiments, the solution is prepared by firmware update service 116 that can prepare firmware update specific to the device experiencing the problem. Payment server 110 can send the firmware update to point-of-sale terminal 106 to either be installed on point-of-sale terminal 106 if point-of-sale terminal 106 is the device experiencing the problem, or point-of-sale terminal 106 can pass firmware update to payment object reader 102 if payment object reader 102 is the device experiencing the problem.

When error log 112 is located on point-of-sale terminal 106 hardware remediation service 108 can determine (204) at the performance metrics indicate a performance problem with the device by analyzing error log 112, and can identify (206) a solution to the problem that will prevent the device from experiencing the problem further, it can implement the solution itself if the problem occurs on the point-of-sale terminal 106 or can communicate the solution to payment object reader 102.

Figure 4:
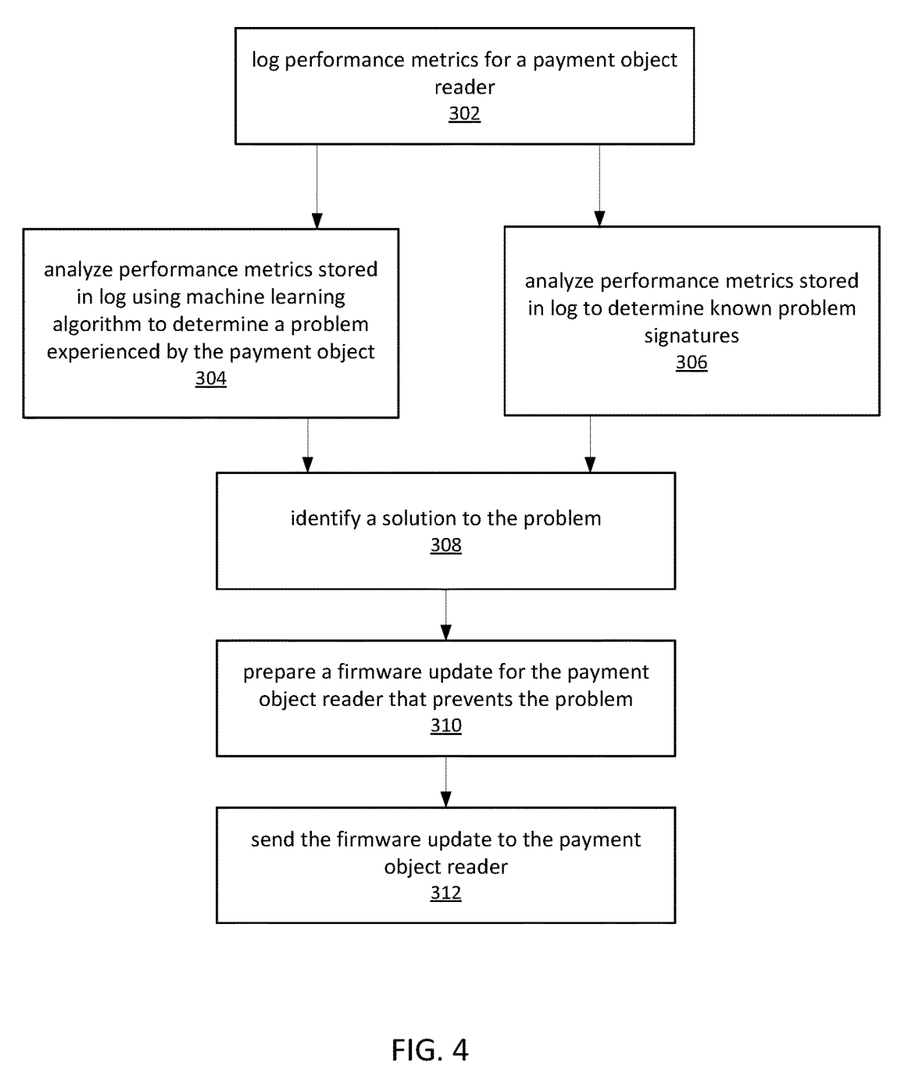
FIG. 4 illustrates an example method of the present technology.

FIG. 4 illustrates an example method that addresses an embodiment wherein payment server 110 provides a firmware update to prevent or solve a problem experienced by payment object reader 102. First payment object reader 102 records performance metrics regarding its operation, transmits them to point-of-sale terminal 106, which in turn transmits them to payment server 110 which logs (302) performance metrics for payment object reader 102 in error log 112 on payment server 110.

Log 112 of performance metrics on payment server 110 can include performance metrics for many payment object reader devices 102. Performance metrics sent by each payment object reader 102 can be associated with an unique identifier of the specific payment object reader 102.

Persons skilled in the art will recognize that there are many ways to analyze the log of performance metrics 112. FIG. 4 illustrates two such ways of analyzing log of performance metrics 112 that can be used as alternatives or in combination. In some embodiments log 112 can be analyzed using a machine learning algorithm (304) to determine the problem experienced by payment object reader 102. As is known in the art the machine learning algorithm maybe a trained or an untrained machine learning algorithm. One advantage of using a machine learning algorithm is that a machine learning algorithm may be able to identify problems occurring in dimensions not previously conceived of by a human programmer. However, problems identified that have not been conceptualized by a human programmer may be more difficult to automatically solve. Accordingly, in another embodiment, performance metrics in log 112 can be analyzed (305) using an algorithm or heuristic configured to identify known problems signatures.

In some embodiments known problem signatures include a characterization of problems that have been observed to exist in similar hardware components. For example, a Bluetooth interface may report that it is observing a high number of disconnections on a particular channel, or that transmissions over a particular channel has encountered a higher than normal amount of packet loss. As these problems are known, Bluetooth controllers are configured to handle such problems when they are encountered. But the solutions built into Bluetooth controllers do not provide an adequate solution for reoccurring environmental problems. For example Bluetooth controllers are configured with a timeout interval for connections over a given channel. When the timeout interval is exceeded, the Bluetooth controller may drop the connection on that channel and try to connect over another channel. However Bluetooth controller will not learn that connections over particular channel are commonly dropped and discontinue attempting to use that channel. Rather a Bluetooth controller will attempt to connect to any channel that appears clear when the connection is initiated. This is especially insufficient in an environment where noise or interference on a channel occurs only intermittently.

Another known problem signature might exist for USB connections. It may be observed that a USB connection is subject to a lot of interference in the data transmission is not reliable.

While, the above examples have been given regarding a Bluetooth controller and USB it should be appreciated at almost any hardware component can have known characterizations of common problems experienced by that hardware component.

When the analysis of performance metrics by machine learning (304) or by algorithm or heuristic (306) indicates that the log performance metrics indicate a performance of a hardware component for specific device that matches a known problem type, error analysis service 114 can identify (308) a solution to the problem by looking up the problem signature in a solutions database. For example, if the observed problem is that the Bluetooth controller continuously disconnects when communicating over a particular channel, the solution can be to increase the timeout interval when it is observed that the interference causing the disconnection is intermittent. Another solution to the same problem is to discontinue use of that particular channel in the future. In the USB example where the data transmission is unreliable, the solution can be to configure the USB controller to send transmissions using a nonstandard transmission protocol that includes a greater amount of error correction such as cyclic redundancy checks. Another solution can be to open up another communication channel such as over Bluetooth or Wi-Fi to be used redundantly or as a backup when the USB channel fails.

Once error analysis service 114 identifies a possible solution, firmware update service 116 can prepare (310) a firmware update for the payment object reader that will prevent the problem. Firmware update service 116 can then send (312) the firmware update to point-of-sale terminal 106 which then passes the firmware update to payment object reader 102 where is installed. In this way, known hardware problems affecting particular device, but not a full model line of product devices can be automatically remediated or solved, thereby avoiding calls for product support.

Figure 5:
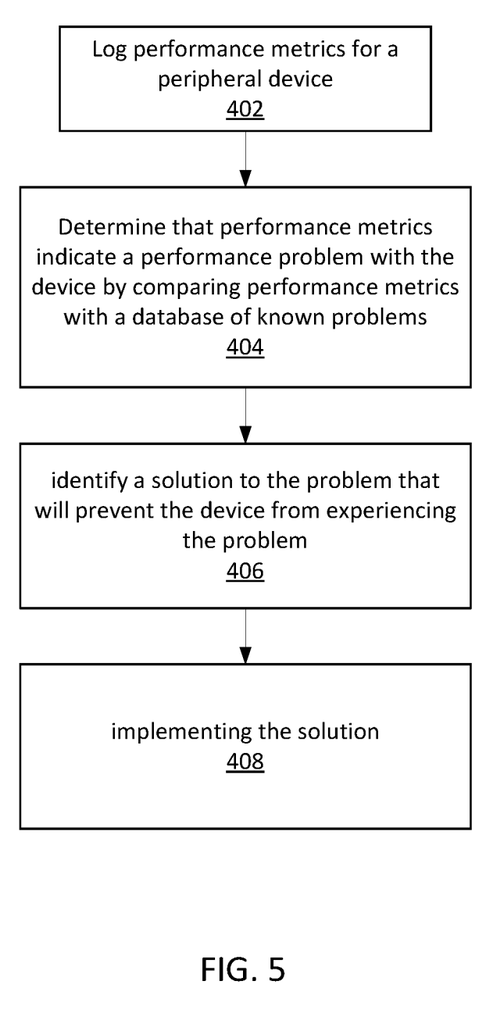
FIG. 5 illustrates an example method of the present technology.

FIG. 5 illustrates an example method wherein client device 126 can identify a performance problem with peripheral device 122 and implement a solution. As noted above, descriptions of client device 126 can also apply to point-of-sale terminal 106, and descriptions of peripheral device 122 can also apply to payment object reader 102.

Client device 126 can log (402) performance metrics for peripheral device 122 in error log 112. Peripheral device 122 can include integrated and/or attached devices including but not limited to communication devices, displays, input devices, storage devices, media devices, interfaces, printers, card readers, etc.

Client device 126 can analyze error log 112 to determine (404) that the logged performance metrics indicate a performance problem with peripheral device 122 by comparing the logged performance metrics with a database of known problem signatures. When it is determined (404) that the log of performance metrics indicates a known problem, client device 126 can identify (406) a solution to the problem or prevent peripheral device 122 from experiencing the problem in the future, and can implement (408) the solution.

In some embodiments, implementing (408) the solution can include providing an instruction to peripheral device 122 to adjust its operation. In some embodiments implementing (408) solution can include providing a firmware update or driver update for peripheral device 122. In some embodiments the firmware update or the driver update may be requested from an online server such as server 120.

In some embodiments, error analysis service 114 can perform additional analysis beyond merely determining a problem signature to determine a context for the observed problem signature. For example error analysis service 114 can also analyze data regarding when particular problem has occurred in the past. Such analysis may reveal patterns associated with a particular problem. For example a particular problem may be more likely to occur at a particular period during the day or week. In another example, the particular problem may be a short-lived problem such that while the problem may be detected frequently, it quickly resolves itself. In another example, a particular problem may only occur when a particular product is purchased using point of sale terminal 106 (e.g., shortly after a smoothie is purchase a blender might cause interference). These patterns are just examples and may be determined from human observations, or by machine learning.

The patterns mentioned above can provide context to particular problems observed in payment object reader 102.

Figure 6:
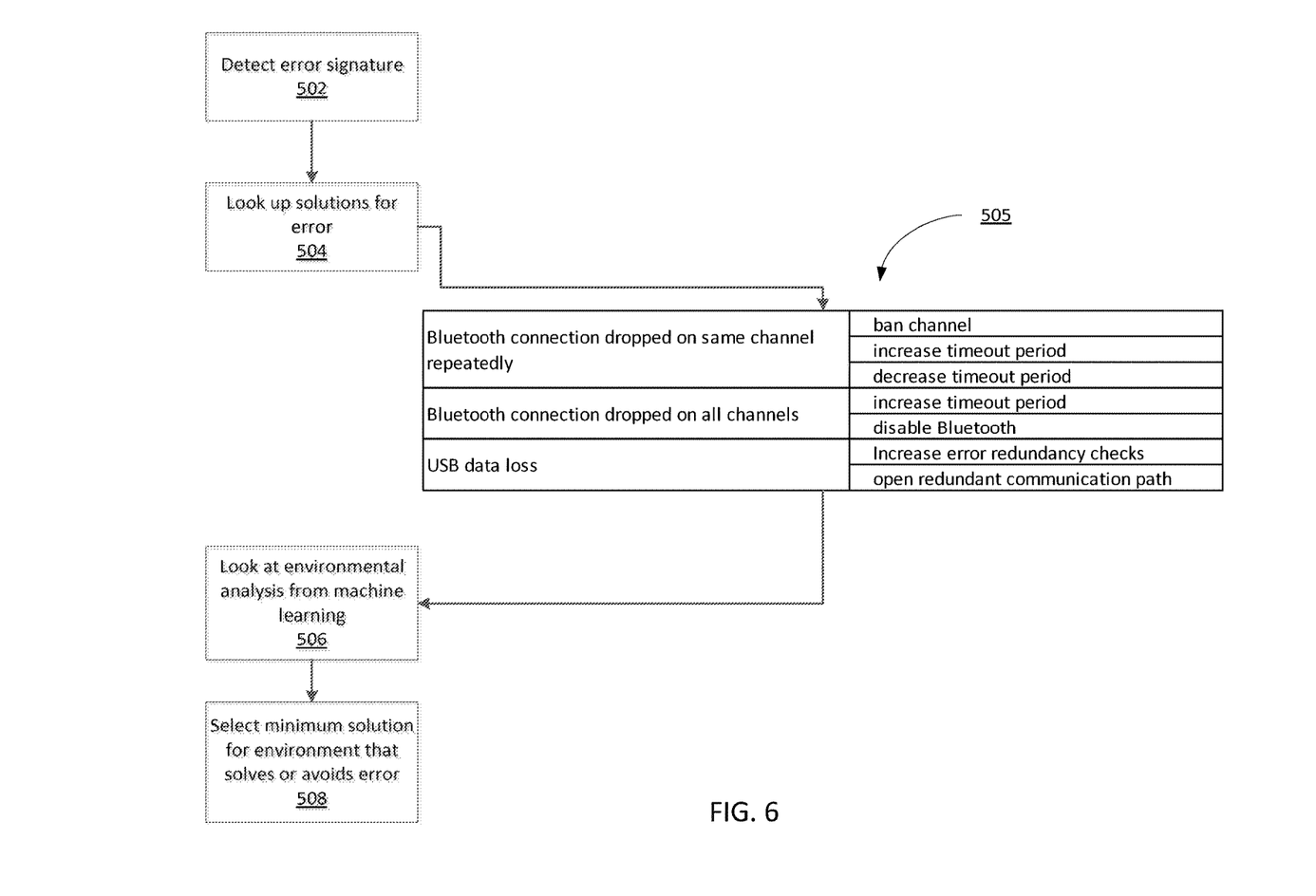
FIG. 6 illustrates an example method of the present technology.

FIG. 6 illustrates an example method for determining an appropriate solution to the observed problem signature when taking account the context in which the problem signature is observed. As addressed above, error analysis service 114 detects (502) an error signature, and looks up (504) solutions for the error in a database, for example table 505.

Table 505 includes a description of possible error signatures on the left and possible solutions on the right. For each error signature in table 505, there are at least two solutions. Error analysis service 114 can contain logic to select (508) from among the possible solutions and can take into account the context (506) the error signature is observed, and for that solves or avoids the error in the context in which it is observed.

For example if the error signature indicates that a Bluetooth connection is repeatedly dropped on the same channel and the context analysis reveals that the connection is just as likely to be dropped at any time during the day, the best solution might be to ban the channel for which connections are dropped. The fact that the connection may be dropped any time during the day might indicate a reoccurring interference that is difficult to predict or avoid. However, if the problem signature indicates the Bluetooth connection that is dropped repeatedly on the same channel occurs infrequently, and when connections are dropped the channel becomes reusable within a short period of time, the best solution might be to increase the timeout interval before a connection is considered dropped. The fact that the connection appears dropped only infrequently and that the channel becomes usable within a short period of time may indicate a sudden but fleeting interference for which it is more effective to wait for the interference to end. However, if the problem signature indicates that the Bluetooth connection is dropped repeatedly on the same channel, and once the connection is dropped it is unlikely to be recovered for a longer period of time, it may make sense to decrease the timeout interval since once it appears that the connection is dropped it will only create a worse user experience to attempt to continue to use the connection over that channel when connect contextual analysis reveals it is unlikely that channel will be usable again in a short time.

When the problem signature indicates that once a connection is dropped that no channel will be usable, the best solution may be to increase the timeout interval until the Bluetooth connection becomes available again since there are limited other alternatives. However if contextual analysis indicates that once a connection is dropped that the Bluetooth interface will not be available within a reasonable period of time the best solution might be to disable Bluetooth so that a user will be required connect payment object reader 102 via a USB 105 to point-of-sale terminal 106. While the user may not appreciate the initial inconvenience of being required to use a wired connection, this will provide a better user experience in the long run. Alternatively when the problem signature identifies data loss over a wired connection, the solution can be to initiate a redundant wireless connection.

When the problem signature indicates data loss over a USB connection, contextual analysis may indicate that the data loss is more likely to occur during a period of time in the morning. For example perhaps a coffee grinder is run in the morning hours that causes interference with the USB connection. When contextual analysis indicates the problem signature is more likely to be experienced during the morning, it might be most effective to open a redundant communication path during morning. However if the USB connection is still usable to provide a sufficient user experience, it might be more preferable to slow the transmission rate and increase error redundancy checks for transmissions over the USB connection.

While the present technology is suited to implementing solutions to observed problem signatures for a specific device, it can be observed that a specific solution has been issued to many devices. When such an observation is made it may be more efficient to issue a firmware update for all devices of the same model rather than solve the problem one specific device at a time. This could be accomplished by error analysis service 114 determining that a greater than a threshold number of devices in a product line requires a solution. For example, error analysis service 114 may be aware 2000 devices of a particular model line have been issued and that greater than 5% of those devices require a particular solution. In such instances firmware update service 116 can issue a firmware update to all such payment object readers 102.

In some embodiments payment object reader can have a separate memory space for device specific firmware updates. This way when general firmware updates are issued to payment object reader 102 they do not overwrite device specific firmware updates. In some embodiments, after a general firmware update, payment object reader 102 can re-download any device specific firmware updates.

Figure 7:
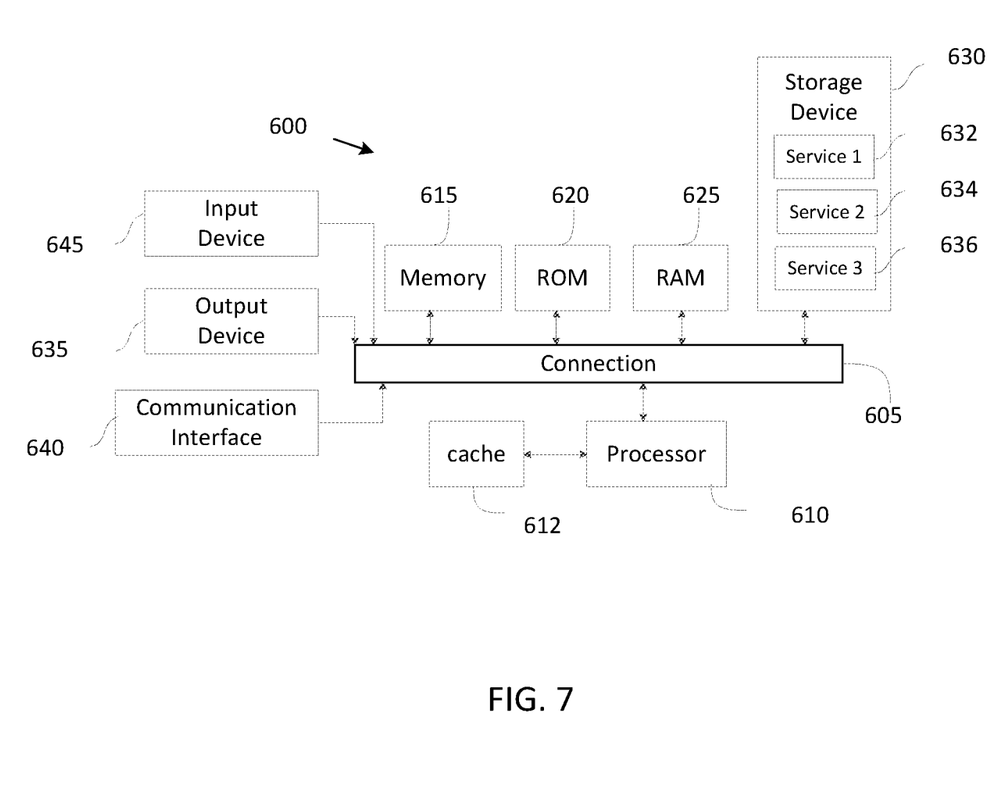
FIG. 7 shows an example of a system for implementing certain aspects of the present technology.

FIG. 7 shows an example of computing system 600 such as payment object reader 102, point of sale terminal 106, payment server 110, client device 126. The components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system having a hardware processor for improving performance of a specific payment object reader from a model line of similar payment object readers to account for intermittent performance degradation experienced in the specific payment object reader caused by intermittent environmental operating conditions, and the intermittent performance degradation may not be experienced by the similar payment object readers, the system comprising:
   an error log of a server of an entity responsible for supporting the payment object reader, the error log storing performance metrics for the specific payment object reader;
   an error analysis service of the server to determine that the performance metrics indicate a repeated problem experienced by the specific payment object reader due to the intermittent environmental operating condition, and to identify a solution to prevent the specific payment object reader from experiencing the repeated problem caused by the intermittent environmental operating condition; and
   a firmware update service to issue a firmware update including the solution, wherein the firmware update was prepared specifically for the specific payment object reader and improves the performance of the specific payment object reader experiencing the intermittent environmental operating condition.

2. The system of claim 1, wherein the error log includes performance metrics reported by a plurality of similar payment object readers.

3. The system of claim 1, wherein the error analysis service determines that the performance metrics indicate a repeated problem experienced by the specific payment object reader by analyzing the performance metrics stored in the error log using a machine learning algorithm, wherein the machine learning algorithm identifies the repeated problem experienced by the specific payment object reader.

4. The system of claim 1, wherein the error analysis service determines that the performance metrics indicate a repeated problem by identifying known problem signatures.

5. The system of claim 4, wherein the error analysis service identifies the solution by looking up the solution in a solutions database including solutions for the known problem signatures.

6. The system of claim 1, wherein the repeated problem experienced by the specific payment object reader is data loss over a wired connection, and the solution is to implement a slower data transmission rate with additional redundancy checks.

7. The system of claim 1, wherein the repeated problem experienced by the specific payment object reader is data loss over a wired connection, and the solution is to initiate a redundant wireless connection.

8. The system of claim 1, wherein the repeated problem experienced by the specific payment object reader is connection loss over a wireless connection, and the solution is to increase a timeout period for the wireless connection.

9. The system of claim 1, wherein the repeated problem experienced by the specific payment object reader is connection loss over a wireless connection on a specific port channel, and the solution bans the specific port channel from use by the specific payment object reader.

10. The system of claim 1, wherein the repeated problem experienced by the specific payment object reader is limited to a period during a day, and wherein the solution applies only during the period.

11. A method comprising:
   logging performance metrics for a connectivity device of a payment object reader, wherein the performance metrics reflect normal connectivity interrupted by a repeated and intermittent connectivity challenge between the connectivity device of the payment object reader and another device due to an intermittent environmental operating condition;

determining that the logged performance metrics indicate the repeated and intermittent connectivity challenge due to the intermittent environmental operating condition;

identifying a solution for the specific payment object reader to prevent the repeated and intermittent connectivity challenge due to the intermittent environmental operating condition, wherein the solution is a firmware update prepared specifically for the specific payment object reader; and implementing the solution for the specific payment object reader to improve the performance of the specific payment object reader experiencing the intermittent environmental operating condition.

12. The method of claim 11, wherein the logging, determining, identifying, and implementing a solution are performed by a payment server.

13. The method of claim 11, wherein the logging, determining, identifying, and implementing a solution are performed by the another device to which the payment object reader is connected.

14. The method of claim 11, wherein the logging, determining, identifying, and implementing a solution are performed by a payment object reader.

15. The method of claim 12, wherein implementing a solution includes sending a firmware update including the solution to the payment object reader, wherein the firmware update is specific to the specific payment object reader.

16. The method of claim 11, wherein determining that the performance metrics indicate the repeated and intermittent connectivity challenge includes analyzing the performance metrics to identify a known connectivity problem signature, and the identifying a solution includes looking up the known connectivity problem signature in a solutions database.

17. A non-transitory computer-readable medium including instructions stored thereon, when executed by a computer system the instructions being effective to cause the computing system to:

log performance metrics for a connectivity device of a payment object reader wherein the connectivity device is a USB, Bluetooth, Wi-Fi, or Ethernet device;

determine that the logged performance metrics indicate an intermittent and repeated connectivity challenge due to an intermittent environmental operating condition;

identify a solution for the specific payment object reader to prevent the intermittent and repeated connectivity challenge due to the intermittent environmental operating condition, wherein the solution is a firmware update prepared specifically for the specific payment object reader; and implement the solution for the specific payment object reader to improve the performance of the specific payment object reader experiencing the intermittent environmental operating condition.

18. The non-transitory computer-readable medium of claim 17, wherein the instructions to log, determine, identify, and implement a solution are performed by a payment object reader.

19. The non-transitory computer-readable medium of claim 17, wherein the instructions to implement a solution includes sending a firmware update including the solution to the payment object reader, wherein the firmware update is specific to the specific payment object reader.

20. The non-transitory computer-readable medium of claim 17, wherein the instructions to determine that the performance metrics indicate the intermittent and repeated connectivity challenge includes analyzing the performance metrics to identify a known connectivity problem signature, and the identifying a solution includes looking up the known connectivity problem signature in a solutions database.

* * * * *